United States Patent Office 3,504,880
Patented Apr. 7, 1970

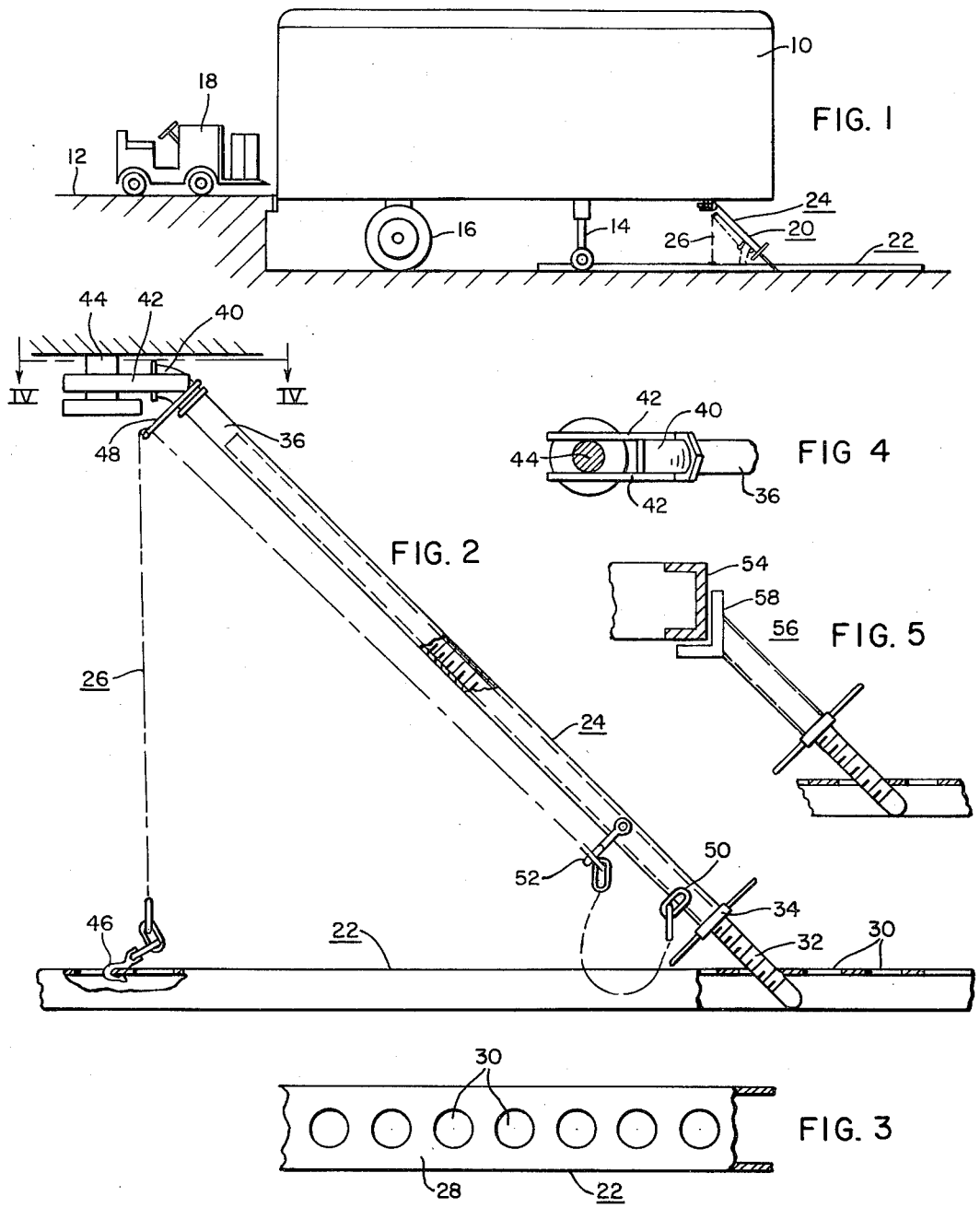

3,504,880
TRUCK TRAILER BRACING ARRANGEMENT FOR LOAD TRANSFERRING
Ray E. Toms, Upper Arlington, Ohio, assignors to Westinghouse Electric Corporation, Pittsburgh, Pa., a corporation of Pennsylvania
Filed July 19, 1968, Ser. No. 746,150
Int. Cl. B60t 3/00; B65j 1/12, 1/20, 1/22
U.S. Cl. 248—361                                    7 Claims

ABSTRACT OF THE DISCLOSURE

A bracing arrangement to be used during loading or unloading of a truck trailer to prevent forward movement of the trailer, and its tilting up or down, as fork lift trucks and such vehicles drive into and out of the trailer, the bracing arrangement including a rigid diagonally-disposed brace having an upper end engaging the kingpin of the trailer and a lower end detachably received in a ground-anchored member which the trailer front end straddles, and a selectively usable tie-down chain which hooks into the ground-anchored member below the kingpin to hold the upper end of the brace against upward movement.

BACKGROUND OF THE INVENTION

Field of the invention

The invention generally relates to vehicle bracing arrangements and particularly relates to a bracing arrangement for truck trailers to prevent their movement during loading or unloading operations.

Description of the prior art

Examples of the prior art in which truck trailers without the tractor are braced and supported for transportation on railroad cars are exemplified by U.S. Patents 2,036,344 and 3,183,854. The problems to which these patents are directed are those of adequately securing a truck trailer for transportation upon a railroad car, and are directed to a substantial degree toward factors which are of no consequence in connection with my invention. That is, the trailer transported on a railroad car must not only be braced against substantial movement, but must include heavy means to support the front end of the trailer, and means for cushioning the trailer against the severe forces to which it is subjected during normal transportation on a railroad car. In contrast, my invention deals with means for temporarily bracing a parked trailer where the forces are less severe in nature, but ease and speed in installing and removing the bracing are important.

When a truck trailer is parked at a loading dock with the tractor removed and the trailer front end supported by its landing gear in a down position, four potentially destructive occurrences are possible. A heavily loaded fork lift truck driven to the extreme front end of the trailer can cause the trailer to nose down about its landing gear. If the fork lift truck is driven vigorously and then stopped suddenly, the trailer has a tendency to move forwardly away from the loading dock. Third, if the front end of the trailer is not loaded, and the main running wheels of the trailer are set forwardly a substantial distance from the rear of the trailer, a heavily loaded fork lift truck entering the rear of the trailer can cause the front end of the trailer to nose up. Finally, a trailer which is loaded extremely heavily, relative to the strength of the landing gear, can cause the landing gear to fatigue and crumble so that the trailer noses down.

My invention is intended to prevent all of these potential occurrences by means of a bracing arrangement which is simple in concept, of relatively low cost, and adapted to be quickly and easily installed and removed.

SUMMARY OF THE INVENTION

The bracing arrangement according to my invention includes three principal elements, a ground-anchored member, a diagonally-disposed, adjustable length, rigid brace having a lower end detachably engaging the ground-anchored member and an upper end engaging the kingpin of the trailer, and tie-down means having a lower end connected to the ground-anchored member below the kingpin, the upper portion of the tie-down means holding the upper end of the brace from raising.

In its currently preferred form, the ground-anchored member comprises a downwardly-open channel member having a plurality of spaced-apart apertures in its web, and disposed transverse to the loading dock so that it is substantially straddled by the trailer when parked. The rigid brace should be of a character which is substantially unyielding in compression and include means for adjusting its length. Such a member may take the currently preferred form of a relatively long, externally threaded rod which is slidably received in a pipe, with a spinner nut on the threaded member for adjusting the length of the brace. The lower end of the brace may be simply inserted into one of the apertures in the channel, and the upper end of the brace includes a yoke portion which is moved into engagement with the kingpin in a front-to-rear direction relative to the trailer to prevent the disengagement of the kingpin therefrom in at least an upward, forward and sideways direction.

The tie-down means may, in an elementary form, comprise a length of chain with a hook at the end adapted to engage one of the channel holes, and extending upwardly through a loop adjacent the upper end of the brace and down along the length of the brace to be fastened in a chain hook carried by the brace so that the tie-down means, when secured, is substantially unyielding in tension to prevent the nose of the trailer from being elevated to a degree permitting disengagement of the yoke from the kingpin.

DRAWING DESCRIPTION

FIGURE 1 is a side view of a trailer positioned in a loading dock for load transferring activities with the bracing arrangement according to the invention in place;

FIG. 2 is a fragmentary, partly broken, enlarged side view of the bracing arrangement according to the invention, enlarged with respect to FIG. 1;

FIG. 3 is a top view of a portion of the ground-anchored member;

FIG. 4 is a horizontal section corresponding to one taken along the line 4—4 of FIG. 2; and FIG. 5 is a fragmentary side view of means for bracing the front end of a tractor against movement when it is left in place during loading or unloading of the trailer.

PREFERRED EMBODIMENT OF THE INVENTION

FIGURE 1 illustrates a typical large trailer 10 of the tractor drawn type in a position backed up to a loading dock 12 and parked. The tractor (not shown) has been removed, and the landing gear 14, and the main running wheels 16 support the trailer for loading and unloading activities. In the loading process, the fork truck 18 and similar vehicles typically enter the rear of the trailer and deposit or remove the articles to be transferred in the loading activity. As was noted previously, overly vigorous driving of the fork truck, rapid stopping, and extremely heavy loading can result in forward movement of the trailer, or nosing down, or tilting back, or landing gear crumbling in certain extreme cases, if adequate bracing and support is not provided for the trailer. In that connection it is noted that the landing gear 14 of the trailer is ordinarily not designed to withstand severe loads over extended periods, nor to provide substantial bearing surface against the ground.

The bracing arrangement in its general relation to the trailer is shown in FIG. 1 and identified by the numeral 20, and is illustrated in more detail in FIGS. 2 to 4. The bracing arrangement includes the ground-anchored member 22, the rigid brace 24, and the tie-down means 26.

The ground-anchored member may take the form of a downwardly-open steel channel of relatively heavy stock and sufficiently long as to underlie the area in which the kingpin of various length trailers will be located when the trailer is backed up to the loading dock, as well as preferably extend forwardly to project in front of the tractors when parked. The channel extends transversely to the edge of the loading dock so that it is substantially straddled by the trailer when parked. It may be anchored to the ground in various conventional ways such as setting its flanges with outward projections therealong in concrete, or tying it down at spaced intervals with bolts extending down into concrete. The web 28 of the channel is provided with a series of holes spaced apart along the length of the channel. For practical purposes, I have found that a channel of about 20 feet long, six inches wide, provided with 2½ inch diameter holes on four inch centers works well. The holes 30 in the channel serve as the engaging means for the bottom end of the brace 24, and as the engaging means for the bottom end of the tie-down means 26.

The rigid brace 24 illustrated comprises: an externally-threaded, steel rod 32 upon which is adjustably received the spinner nut 34 which has an internally threaded hub and a pair of opposite outwardly-directed arms for turning the spinner nut to move it along the threaded member 32; a length of hollow pipe 36 which receives the portion of the threaded member on one side of the spinner nut, and bears against the nut in the installed position of the brace; and, an upper, kingpin-engaging-end 38 which may be fashioned from a 45 degree L 40 with a pair of pieces of bar stock 42 welded to opposite sides of the L to provide a yoke which is open at the rear to receive the shank of the kingpin 44 with the shoulder of the kingpin underlying the yoke. In one quite satisfactory version of the bracing arrangement, the threaded member 32 comprises a 1¼ inch diameter threaded rod of about four feet in length, and the pipe 36 is standard 1¼ by 48 inch iron pipe. The L 40 may be a standard 1½ inch pipe 45 degree L threaded onto a standard 1½ to 1¼ inch pipe reducer which is received into the upper end of the pipe 36.

The tie-down means 26 in the currently preferred form may comprise a length of ordinary steel ⅜ inch chain about nine feet long, with the one end having a standard ⅜ inch chain hook 46 which serves to detachably secure the end of the chain underlying the kingpin to an aperture in the channel 22, the chain then extending upwardly and loosely through a loop 48 near the upper end of the brace 24, and then downwardly to a point 50 near the bottom end of the pipe 36 where the end of the chain may be welded to the pipe. Near the weld location 50, another standard chain hook 52 is welded to the pipe so that when the bracing arrangement is secured in place with the hook 46 secured to the channel, th echain may be pulled reasonably taut and secured by slipping the link located at the hook 52 into the hook.

It will be appreciated that the function of the tie-down means 26 is to prevent the front end of the trailer from nosing up when a heavy load is imposed on the back end of the trailer with the axle of the running wheels 16 serving as a fulcrum. In some instances, the main running gear of the trailer may be sufficiently close to the rear of the trailer that, as a practical matter, nosing up of the trailer is precluded regardless of the weight of the fork lift and load driven onto the rear of the trailer. In this case, of course, it is not necessary to utilize the tie-down means.

The arrangement according to the invention also lends itself to use in a modified form as illustrated in FIG. 5, where the front bumper 54 of a tractor (not shown) is braced against forward movement by the brace 56, which is essentially a miniature version of the larger brace 24 used with a trailer. The upper end of the miniature brace is formed of an angle 58 welded to the pipe to accommodate the bumper. It will be understood that with the trailer attached to the tractor during load transferring activities, the need for bracing is essentially limited to that precluding forward movement.

MANNER OF USE SUMMARY

After the trailer is parked with the landing gear down to support it and the tractor removed, the upper end of the brace is moved into engagement with the kingpin, the lower end is placed in one of the sockets 30 to give the desired diagonal disposition, and the spinner nut is turned up to insure that the brace is relatively rigid in compression. This also insures that the trailer is back against the loading dock so that it cannot move rearwardly. Then the lower hook 46 of the chain is hooked into one of the channel holes and pulled taut through the loop 48 and secured at hook 52 on the pipe. In this position, the bracing arrangement prevents nosing up, nosing down, and forward movement, as well as providing some additional vertical support aiding the landing gear 14. The removal of the bracing arrangement is accomplished by reversing the steps.

The bracing arrangement may be applied or removed in approximately 30 seconds.

It is to be appreciated that the specific structural parts which have been given for purposes of example are those which I have found provide a satisfactory, but very inexpensive, arrangement. Differences, and perhaps improvements, in details will likely occur to those skilled in the art.

I claim as my invention:

1. An arrangement for bracing a trailer vehicle having a front end with an underlying kingpin, during load transferring activities at a loading dock, comprising:

a ground-anchored member extending generally transverse to said dock so as to be substantially straddled in a substantially centered relation by said trailer as parked, said ground-anchored member including a number of upwardly-open apertures spaced along its length;

a rigid brace including an upper end carrying means for detachably engaging said kingpin, a lower end received in one of said apertures underlying said vehicle forwardly of said kingpin so that said brace is diagonally disposed in a substantially vertical plane, said brace including means for adjusting its length; and selectively usable flexible tie-down means comprising means detachably connecting said brace upper end to a location of said ground-anchored member substantially vertically below said kingpin, said tie-down means being substantially non-supporting in compression but unyieldable in tension to insure that upon the imposition of a force having an effect of lifting the front end of said trailer, said tie-down means prevents pivotal movement of said opposite ends of said brace out of their locations and thereby prevents disengagement of both said upper and lower ends of said brace from their respective connections.

2. An arrangement for bracing a trailer vehicle having a front end with an underlying kingpin, during load transferring activity at a loading dock, comprising:

a ground-anchored member extending substantially transverse to the dock so as to be straddled in a substantially centered relation by said trailer as parked, said member being of substantial length to accommodate different length trailers and including means spaced along the length thereof to receive the bottom end of brace means;

a brace adapted to extend substantially diagonally downwardly and forwardly in a substantially vertical plane from said kingpin to one of said brace receiving means on said ground-anchored member, said brace being substantially unyielding in compression and including means for adjusting its length, the upper end thereof including kingpin engaging means to prevent disengagement of said kingpin therefrom in at least an upward, forward, and sideways direction, the bottom end of said brace including means received by said brace receiving means on said ground-anchored member to prevent disengagement of said bottom end thereof except in a generally upward direction; and flexible tie-down means adapted to be selectively used in accordance with the possibility of nosing up of said trailer, said tie-down means being yieldable in compression and having a lower end portion adapted to be detachably connected to said ground-anchored member at a location below said kingpin, and extending generally directly upwardly to a connection location adjacent the upper end of said brace to provide a taut connection between said lower end of said tie-down means and the upper end of said brace adjacent said kingpin engaging means if said trailer tends to nose up so that disengagement of both said upper end and said bottom end of said brace from their respective connections is prevented.

3. In an arrangement according to claim 2:
said brace comprises a threaded member carrying a spinner nut adjustable along the length of said threaded member, and a hollow pipe slidably receiving the portion of said threaded member on one side of said spinner nut.

4. An arrangement according to claim 2 wherein:
said kingpin engaging means on the upper end of said brace comprises a bifurcated structure which is rearwardly open and extends at about a 45 degree angle from the axis of said brace, the shank of said kingpin being received between the legs of said bifurcated structure.

5. An arrangement according to claim 2 wherein:
said tie-down means includes a length of chain having a hook at one end adapted to be secured to said ground-anchored member, said brace includes a loop portion adjacent its upper end to slidably receive said chain, and a hook for securing said chain to provide a selected length between said ground-anchored member and said loop spaced from said loop on said brace.

6. An arrangement according to claim 2 wherein:
said brace bottom-end-receiving-means comprises upwardly-open apertures in said ground-anchored member to receive said bottom end of said brace therein.

7. An arrangement according to claim 6 wherein:
said upwardly-open apertures are spaced apart along at least the portion of said ground-anchored member underlying said kingpin and further forward kingpins of larger trailers to be accommodated.

References Cited
UNITED STATES PATENTS

| | | |
|---|---|---|
| 2,099,288 | 11/1937 | Allen. |
| 2,837,038 | 6/1958 | Fahland _____ 188—324 XR |
| 3,054,363 | 9/1962 | Baker. |
| 3,250,506 | 5/1966 | Thouvenelle et al. |

MILTON BUCHLER, Primary Examiner
G. E. A. HALVOSA, Assistant Examiner

U.S. Cl. X.R.
105—368; 188—5